United States Patent
Aoyama et al.

(10) Patent No.: US 6,655,227 B2
(45) Date of Patent: Dec. 2, 2003

(54) CONTROL DEVICE APPLIED IN A SYNCHROMESH-TYPE TRANSMISSION

(75) Inventors: Yoshiyuki Aoyama, Nishio (JP); Takeshige Miyazaki, Anjo (JP); Ryuji Choshi, Aichi-ken (JP); Mitsutoshi Kamiya, Kariya (JP); Yoshihiro Ichikawa, Gifu (JP)

(73) Assignee: Aisin AI Co., Ltd., Nishio (JP)

( * ) Notice: Subject to any disclaimer, the term of this patent is extended or adjusted under 35 U.S.C. 154(b) by 0 days.

(21) Appl. No.: 09/984,943

(22) Filed: Oct. 31, 2001

(65) Prior Publication Data

US 2002/0050182 A1 May 2, 2002

(30) Foreign Application Priority Data

Oct. 31, 2000 (JP) ......................... 2000-333061

(51) Int. Cl.[7] .................. F16H 59/00; F16H 61/00; F16H 63/00
(52) U.S. Cl. .................. 74/335; 74/473.1; 477/97
(58) Field of Search ................ 74/335, 336 R, 74/473.1, 473.21, 473.24, 473.25, 473.27; 477/34, 97, 115, 116

(56) References Cited

U.S. PATENT DOCUMENTS

| | | | | |
|---|---|---|---|---|
| 4,605,109 A | * | 8/1986 | Fukuchi et al. .......... | 192/219 |
| 4,784,007 A | * | 11/1988 | Ishida et al. ............. | 74/335 |
| 4,796,485 A | * | 1/1989 | Ebina ...................... | 74/335 |
| 4,911,031 A | * | 3/1990 | Yoshimura et al. ....... | 74/335 |
| 6,227,063 B1 | * | 5/2001 | Ohmori et al. ........... | 74/335 |
| 6,295,884 B1 | * | 10/2001 | Miyake et al. ........... | 74/335 |
| 6,336,372 B1 | * | 1/2002 | Ogami et al. ............ | 74/335 |

FOREIGN PATENT DOCUMENTS

| | | | |
|---|---|---|---|
| JP | 2000274526 A | * 10/2000 | ........... F16H/61/34 |
| JP | 2001165310 A | * 6/2001 | ............. F16H/3/14 |
| JP | 2002174340 A | * 6/2002 | ........... F16H/61/34 |

* cited by examiner

*Primary Examiner*—Sherry Estremsky
*Assistant Examiner*—Tisha D. Lewis
(74) *Attorney, Agent, or Firm*—Burns, Doane, Swecker & Mathis, LLP

(57) ABSTRACT

A synchromesh-type transmission includes a shift and select shaft axially movable for carrying out a select operation and rotatable for carrying out a shift operation, a plurality of shift fork shafts each provided with a pair of shift heads, and an inner lever fixed to the shift and select shaft. The inner lever is disposed between the pair of shift heads according to the axial moving operation of the shift and select shaft and comes in contact with one of the shift heads according to the rotational moving operation of the shift and select shaft, wherein a shift stage is performed. The inner lever is located at a neutral position according to the rotational operation of the shift and select shaft for the shift operation, wherein no shift stage is performed.

20 Claims, 5 Drawing Sheets

CONTROL DEVICE APPLIED IN A SYNCHROMESH-TYPE TRANSMISSION

This application is based on and claims priority under 35 U.S.C. §119 with respect to Japanese Patent Application No. 2000-333061 filed on Oct. 31, 2000, the entire content of which is incorporated herein by reference.

FIELD OF THE INVENTION

This invention generally relates to a control device for a synchromesh-type transmission for a vehicle. More particularly, the present invention pertains to a control device for a vehicle synchromesh-type transmission in which a neutral position of an inner lever is detected based upon rotation of a shift and select shaft transmitted to a fork shaft.

BACKGROUND OF THE INVENTION

Vehicles such as passenger cars and busses are generally driven by a driving power source such as a gasoline engine or an electric motor. The vehicles include a transmission for performing an optimal running condition in response to road conditions. A shift stage of the transmission is selected or canceled for generating the desired driving torque or speed.

The manual transmission (MT), which is one known type of the above-described transmissions, includes a counter shaft, a main shaft, a plurality of counter gears mounted on the counter shaft, a plurality of idle gears idly mounted on the main shaft and always in meshing engagement with the counter gears, sleeves fixed to a plurality of shift fork shafts, and a synchromesh mechanism for integrally engaging the sleeves with the main shaft. The shift operational force of a shift lever produced by a driver is transmitted to any one of the shift fork shafts via a transmitting member such as a cable to move the selected shift fork shaft. That is, a sleeve corresponding to the selected shift fork shaft is moved according to the shift operational force.

Somewhat recent developments have led to automated manual transmissions which are structurally based on the manual transmission (MT) and are provided with an actuator such as a hydraulic pressure cylinder for moving the shift fork shafts. By virtue of the actuator provided for the automated manual transmission, the operational force inputted by the driver may not be required as much as the manual transmission. The automated manual transmission is provided, for example, with a shift and select shaft axially moved for a select operation and rotated for a shift operation. The axial and rotational movements of the shift and select shaft are transmitted to any one of the shift fork shafts via an inner lever and a shift head.

Referring to FIGS. 5 and 6, an inner lever 50 is formed as a cylindrical portion 51 and an extending portion 52. The inner lever 50 is axially movable with a shift and select shaft 53 and is integrally rotatable with the shift and select shaft 53 in a circumferential direction. An interlock plate 55 is accommodated on the shift and select shaft 53 to close or enclose both edges of the cylindrical portion 51. The interlock plate 55 is provided with a pair of pawl portions 56, 57 surrounding both sides of the inner lever 50. The interlock plate 55 is axially movable with the shift and select shaft 53, but is not rotatable due to a lock ball mechanism 70 which is described later.

When the shift and select shaft 53 is axially moved upon the select operation, the inner lever 50 and the interlock plate 55 are integrally moved with the shift and select shaft 53 in the same direction. Further, the inner lever 50 is engaged with a shift head 61 of a shift fork shaft 60 for the third and fourth shift stages. Each of the pawl portions 56, 57 is engaged with respective shift heads 64, 67 of the shift fork shafts 63, 66.

When the shift and select shaft 53 is rotated in a direction upon the shift operation, the inner lever 50 is integrally rotated with the shift and select shaft 53. The shift fork shaft 60 is moved in a direction in response to rotational movement of the inner lever 50. Thus, one of the sleeves (not shown) is engaged with the corresponding idle gear (not shown) via a shift fork 59. Accordingly, the inner lever 50 is moved from the neutral position to a shift stage position. The inner lever 50 is then operated to be returned to the neutral position from the shift stage position corresponding to a rotational movement of the shift and select shaft 53 in the other direction, whereby the shift fork shaft 60 is rotated in the other direction. Accordingly, the sleeve and the idle gear is disengaged, wherein the inner lever 50 is returned to the neutral position from the shift-stage position.

As shown in FIG. 6, the lock ball mechanism 70 is accommodated adjacent to the inner lever 50 and the interlock plate 55. The lock ball mechanism 70 is provided with a movable member 72 movably disposed in a casing 71. A ball 73 is disposed in the tip end of the movable member 72. A ball groove 74 is defined at the upper surface of the inner lever 50. A through hole 76, which is shown in FIG. 5, is defined at an upper portion of the interlock plate 55. The ball 73 supported at the lower edge of the movable member 72 is biased in a direction to be engaged with the ball groove 74 by a spring 78.

The lock ball mechanism 70 is engaged with the inner lever 50 for guiding the shift fork shafts 60, 63, 66 to the neutral position. As used herein, the "neutral position" represents or refers to the situation in which the inner lever 50 is not engaged with any of the shift heads 61, 64, 67, and the sleeves are not in meshing engagement with the idle gears for preventing the shift fork shafts 60, 63, 66 from being moved. The moving amount of the shift fork shaft 60 is determined corresponding to the rotational amount of the shift and select shaft 53, i.e., the rotational amount of the inner lever 50 based upon the neutral position of the inner lever 50. Therefore, it is of significant importance to correctly detect the neutral position of the inner lever 50.

When a shift operation is performed, for example from a second shift stage to a third shift stage by a transmission provided with a shift pattern as shown in FIG. 7, a sleeve is disengaged from an idle gear for the second shift stage and is engaged with an idle gear for the third shift stage. In the case of the disclosed manual transmission, the above-described shift operation has been performed by virtue of a manual shift operation of the shift lever by the driver. The pushing force of the ball 73, assisted by the spring 78, to the ball groove 74 is larger than the resistance force of the shift mechanism. Therefore, the inner lever 50 is located at the neutral position by the lock ball mechanism 70 immediately before the sleeve is engaged with the idle gear and immediately after the sleeve is disengaged from the idle gear. Meanwhile, according to the automated manual transmission, the rotational movement of the shift and select shaft 53 driven by the actuator may be stopped when the ball 73 is not disposed in the ball groove 74 correctly and then the shift operation is performed. The pushing force of the ball 73 to the ball groove 74 is smaller than a slidable resistance force of the actuator. Therefore, under the above-described condition, the pushing force of the ball 73 is not sufficient for rotating the shift and select shaft 53 to the neutral position. Therefore, the inner lever 50 may not be moved to the neutral position. Under the above condition, if the shift lever is switched from a lower shift stage position to a middle shift stage position by the driver, the inner lever 50 is moved and comes in contact with a shift head for the third shift stage or a fourth shift stage. When the inner lever 50 has not been moved sufficiently and the shift lever is subsequently operated, the inner lever 50 may come in contact with the shift heads for the first and third shift stages or with the shift heads for the second and fourth shift stages. This is called a "double engagement".

To overcome the above-described drawback of the disclosed synchromesh-type transmission, it is logically possible to control an electronic control unit ECU (not shown) based upon signals from a load detecting sensor (not shown) which detects the rotational speed of the shift and select shaft 53 and the rotational position of the shift and select shaft 53 when the inner lever 50 is located at the neutral position. However, such an actual measurement or control may be difficult. Further, such a load sensor is relatively expensive, thus increasing the manufacturing cost of the control device.

The above described drawback may occur when the inner lever 50 is stopped at a position that deviates from the neutral position. Therefore, although the above-described synchromesh-type transmission is provided with the lock ball mechanism 70, the above-described drawback may occur even with a synchromesh-type transmission not having the lock ball mechanism 70. Therefore, an accurate detection of the neutral position of the inner lever 50 is also required for a synchromesh-type transmission which is not provided with the lock ball mechanism 70.

The above described synchromesh-type transmission employs the shaft and select shaft 53 which is axially movable for the select operation and rotatable for the shift operation. However, there are other synchromesh-type transmissions employing a shift and select shaft that is axially movable for the shift operation and rotatable for the select operation, or employing a shift shaft axially movable for the shift operation and a select shaft axially movable for the select operation. The accurate detection of the neutral position of the inner lever 50 is still of significant concern for any of the synchromesh-type transmissions for determining the moving amount of, for example, the shift fork shaft and the sleeve.

It is thus seen that known synchromesh-type transmissions are susceptible of certain improvements with respect to providing an improved control device that performs the accurate detection of the neutral position of the inner lever.

SUMMARY OF THE INVENTION

Various aspects of the transmission and the control device for the synchromesh-type transmission in accordance with the present invention are briefly described below.

Transmission. When a shift operation in the synchromesh-type transmission is performed, an inner lever is operated to be disposed between the shift heads accommodated on any one of shift fork shafts. The inner lever is pushed against a shift head of the other neighboring shift fork shaft and is moved from a shift stage position to a neutral position. According to the present invention, the moving amount of the inner lever is measured until the inner lever is released from the shift head of the neighboring shift fork shaft. Therefore, the transmission is not restricted by requiring a shift and select shaft movable for the select operation and rotatable for the shift operation, and instead can employ, for example, a shift and select shaft moved and rotated in a different manner, a set of shift and select shafts, and others.

Shift fork shaft. The transmissions are generally provided with three or four shift fork shafts. The respective shift fork shafts are supported by a casing and mounted so as to be mutually parallel and axially movable. A portion of each shift fork shaft is provided with a pair of shift heads and another portion of each shift fork shaft is provided with a shift fork which is engaged with a sleeve. When any one of the shift fork shafts is moved, a predetermined sleeve is engaged with a predetermined idle gear corresponding to the movement of the shift fork shaft.

Shift and select shaft. The transmission employs two types of known shift and select shafts. One is axially movable for effecting the select operation and is rotatable around an axis thereof for effecting the shift operation, and the other is rotatable for effecting the select operation and is axially movable for effecting the shift operation. The first mentioned shift and select shaft extends at right angles with the shift fork shaft, and the second mentioned alternative extends parallel to the shift fork shaft. The amount of axial movement and rotational movement of the shift and select shaft is determined based upon how the inner lever, the shift heads, and the shift fork shaft are mutually linked. The shift and select shaft is driven by an actuator such as a hydraulic pressure cylinder.

Shift shaft and select shaft. The select shaft extends at right angles with the shift fork shaft and the shift shaft extends at right angles with the select shaft. The select shaft is provided with the inner lever and is axially movable by the actuator and the shift shaft upon select operation. The shift shaft is axially movable by the actuator upon the shift operation of the shift lever.

Inner lever. The inner lever fixed to the shift and select shaft is moved or rotated integrally with the shift and select shaft. On the other hand, the inner lever fixed to the select shaft is moved integrally with the select shaft in the axial direction thereof. Each inner lever is positioned at a neutral position and travels between the shift heads of each shift fork shaft. When the inner lever is disposed between the shift heads of any one of the shift fork shafts, the inner lever is rotated between the neutral position and a shift stage position. The moving amount and rotational amount of the inner lever is determined based on how the shift and select shaft, the select shaft, the shift heads and the shift fork shafts are mutually linked.

Measuring means. The inner lever is disposed in the shift heads of the selected shift fork shaft, is pushed against a shift head of the other neighboring shift fork shaft, and is moved from a shift stage position to the neutral position. The measured moving amount of the inner lever is the length from a shift stage position where the inner lever is in contact with a shift head of the selected shift fork shaft to a position where the inner lever is released from pushing against a shift head of the other neighboring shift fork shaft. The moving amount of the inner lever is measured by a position sensor disposed adjacent to, for example the shift and select shaft, the select shaft, the inner lever, or the shift fork shaft.

When the inner lever is fixed to the shift and select shaft axially movable for the select operation and is rotated with a slight pushing force in the axial direction (a direction for the select operation) of the shift and select shaft, the inner lever is pushed against the shift head of the neighboring shift fork shaft. When the inner lever is fixed to the shift and select shaft rotatable around the axle for the select operation and is moved with a slight rotational force in the direction for the select operation, the inner lever is pushed against the shift head of the neighboring shift fork shaft. When the shift shaft and the select shaft are employed and the select shaft including the inner lever is applied with a pushing force in the axial direction of the select shaft (the direction for the select operation), the inner lever is pushed against the shift head of the neighboring shift fork shaft.

The inner lever is movable at a right angle of the direction for the select operation and at an acute angle of the direction for the select operation until the inner lever is disengaged from the shift head against which the inner lever has been pushed. Therefore, a moving path of the inner lever is determined corresponding to a side shape of the shift head against which the inner lever is pushed.

The moving amount of the inner lever from a shift stage position to a position for releasing the inner lever from pushing against the shift head is measured between any one of adjacent pairs of parallel shift fork shafts. For example, when three shift fork shafts for lower, middle, and higher shift stages are mounted in parallel, the moving amount of the inner lever is measured between the shift fork shafts for the lower and middle shift stages or between the shift fork shafts for the middle and higher shift stages. Further, the moving amount of the inner lever is measured while the inner lever has been pushed against a shift head of the adjacent shift fork shaft and the other shift head thereof. In this case, the neutral position is detected and a range of the neutral position is detected as well.

The inner lever is moved to the neutral position when the shift fork shaft, i.e. the sleeve, is disengaged from an idle gear for a particular shift stage and when the sleeve is engaged with the other idle gear for the other shift stage sequentially after the sleeve was disengaged from the idle gear for the particular shift stage.

Control means. The control means controls the moving or rotational amount of the shift and select shaft or the moving amount of the shift shaft based upon detected signals from, for example, the sensors. That is, the detected signals are employed as a reference to judge how much the inner lever is moved or rotated corresponding to the moving or rotational amount of the shift and select shaft or the moving amount of the shift shaft. Therefore, it is judged whether or not the inner lever is located at the neutral position. The control means controls the shift and select shaft to be moved and rotated or controls the shift shaft to be moved over a rotatable angular or a distance corresponding to a distance from the neutral position to the shift stage position. The electronic control unit ECU is employed as the control means for controlling the operation of the actuator. The rotational or moving amount of the shift and select shaft or the moving amount of the shift shaft is controlled corresponding to the controlled operation of the actuator.

Lock ball mechanism. The lock ball mechanism is employed for guiding the shift fork shaft, for example to the neutral position, and is engaged with, for example, the inner lever and the shift fork shaft. According to the present invention, the inner lever is stopped at the neutral position. Therefore, the lock ball mechanism is engageable with the shift fork shaft or the inner lever positioned at the neutral position.

According to the present invention, a control device for a synchromesh-type transmission includes a shift and select shaft that is axially movable or rotatable for carrying out a select operation and a shift operation, a plurality of axially movable shift fork shafts arranged in parallel with one another and at right angles with the shift and select shaft, a pair of shift heads mounted on each of the shift fork shafts at a position opposed to the shift and select shaft, and an inner lever fixed to the shift and select shaft and positionable between the pair of shift heads mounted on one of the shift fork shafts based on axial movement operation or rotational operation of the shift and select shaft for the select operation. The inner lever moves from a neutral position and comes in contact with one of the shift heads based on the rotational operation or axial movement operation of the shift and select shaft upon the shift operation, or the inner lever is released from the one shift head and returns from the shift stage position to the neutral position based on the rotational operation or axial movement operation of the shift and select shaft upon the shift operation. A measuring mechanism measures a moving amount of the inner lever from the shift stage position to the neutral position, with the inner lever disposed between the pair of shift heads of any one of the shift fork shaft being moved from the shift stage position to the neutral position while being pushed against a shift head of a neighboring shift fork shaft. A control device controls the rotational amount or axially movement amount of the shift and select shaft based upon the moving amount measured by the measuring mechanism.

According to another aspect of the invention, a control device for a synchromesh-type transmission includes a plurality of axially movable shift fork shafts disposed in parallel with one another, a select shaft axially movable for carrying out a select operation and arranged at right angles with the plurality of shift fork shafts, a shift shaft axially movable for carrying out a shift operation and disposed at right angles with the select shaft, a pair of shift heads mounted on each of the shift fork shafts at a position opposed to the select shaft, and an inner lever fixed to the select shaft in opposing relation to the plurality of shift fork shafts. The inner lever is disposed between the pair of shift heads mounted on any one of the shift fork shafts in accordance with axial moving operation of the select shaft upon the select operation. The inner lever comes in contact with one of the shift heads in accordance with axial moving operation of the shift shaft upon the shift operation, or the inner lever is released from the one shift head and returns from the shift stage position to the neutral position in accordance with the axial moving operation of the shift shaft upon the shift operation. A measuring mechanism measures a moving amount of the inner lever from the shift stage position to the neutral position, with the inner lever disposed between the pair of shift heads of one of the shift fork shafts moved from the shift stage position to the neutral position being pushed against a shift head of a neighboring shift fork shaft. A control device controls the amount of axial moving of the shift shaft based upon the moving amount measured by the measurement mechanism.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

FIG. 1 is a schematic block diagram illustrating a syncromesh-type transmission and a control device according to a first embodiment of the present invention.

FIGS. 2(a)–(c) are schematic illustrations of a part of the syncromesh-type transmission shown in FIG. 1 depicting the operation of the first embodiment of the present invention.

DETAILED DESCRIPTION OF THE INVENTION

Figure 1:
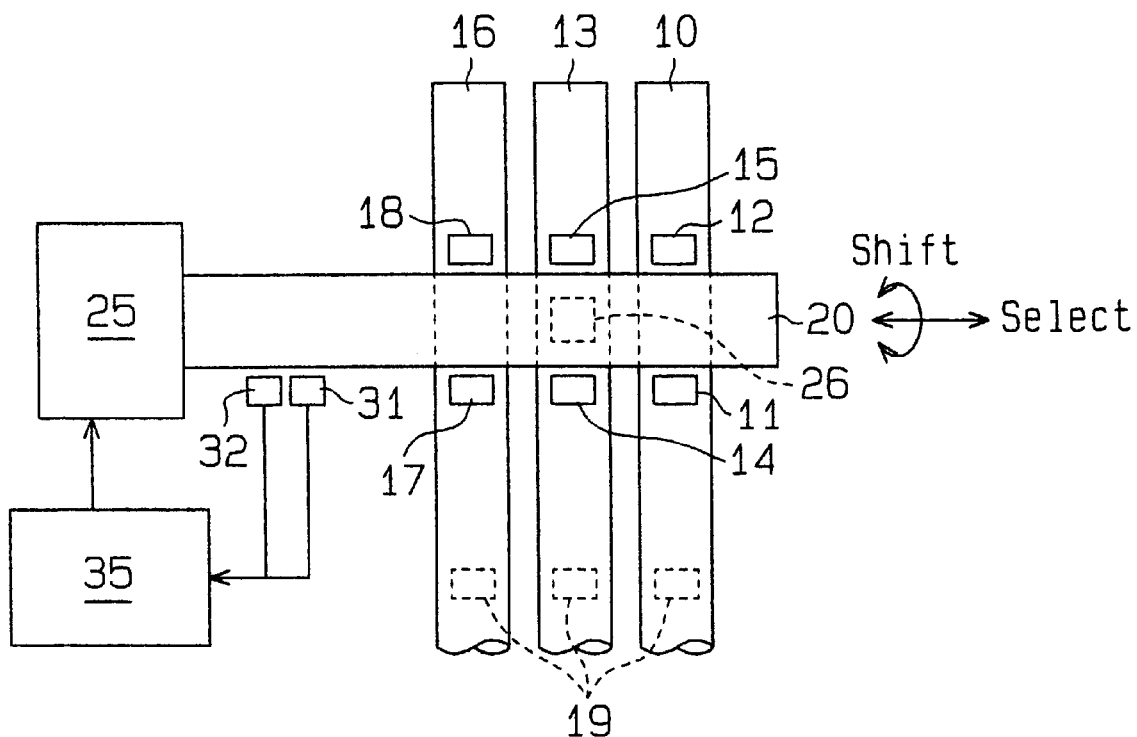

Referring to FIG. 1, a synchromesh-type transmission is provided with three parallel shift fork shafts 10, 13, 16, a shift and select shaft 20 disposed at right angles with the shift fork shafts 10, 13, 16, an actuator 25 for driving the shift and select shaft 20, and an inner lever 26 fixed to the shift and select shaft 20. A first pair of shift heads 11, 12 is accommodated on the shift fork shaft 10 at positions on opposite sides of the shift and select shaft 20, a second pair of shift heads 14, 15 is accommodated on the shift fork shaft 13 at positions on opposite sides of the shift and select shaft 20, and a third pair of shift heads 17, 18 is accommodated on the shift fork shaft 16 at positions on opposite sides of the shift and select shaft 20. Each shift fork shaft 10, 13, 16 is provided with a respective shift fork 19.

The shift fork shafts 10, 13, 16 are respectively provided for the lower shift stage, the middle shift stage, and the higher shift stage. The shift and select shaft 20 is axially moved by the actuator 25 when a shift lever is operated for carrying out a select operation, and is rotated when the shift lever is operated for carrying out a shift operation. The inner lever 26 is integrally moved or rotated with the shift and select shaft 20 when the shift and select shaft 20 is moved or rotated.

Figure 2C:
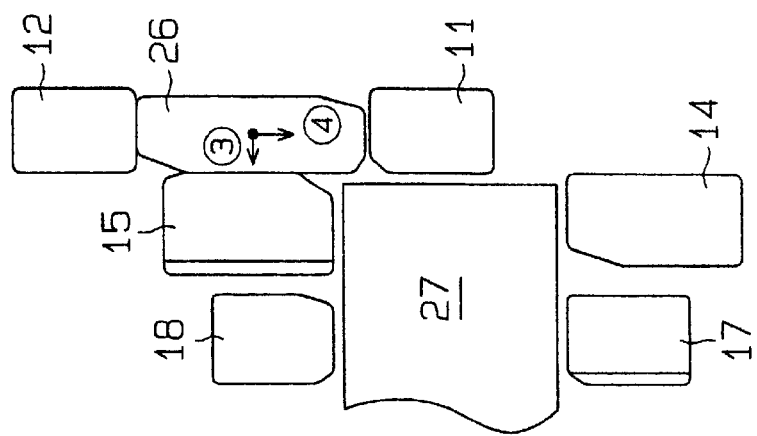
Figure 2B:
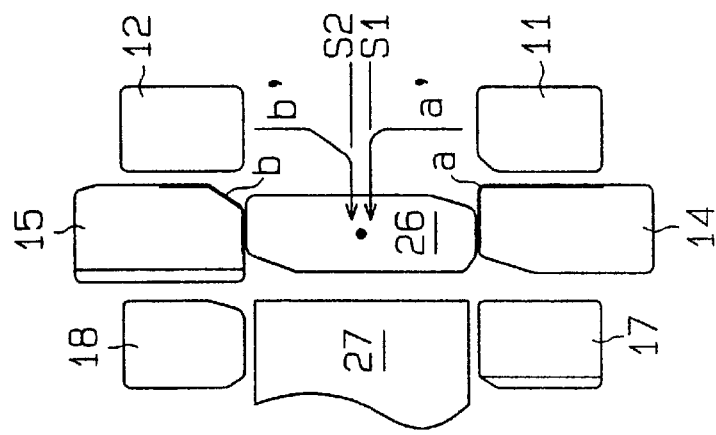
Figure 2A:
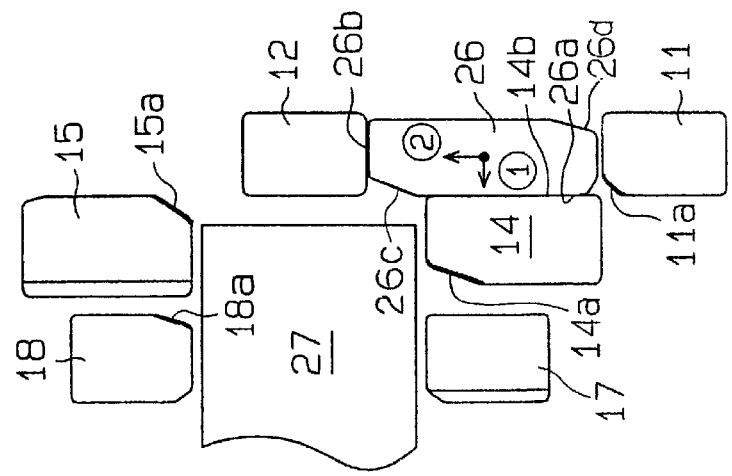
Figure 5:
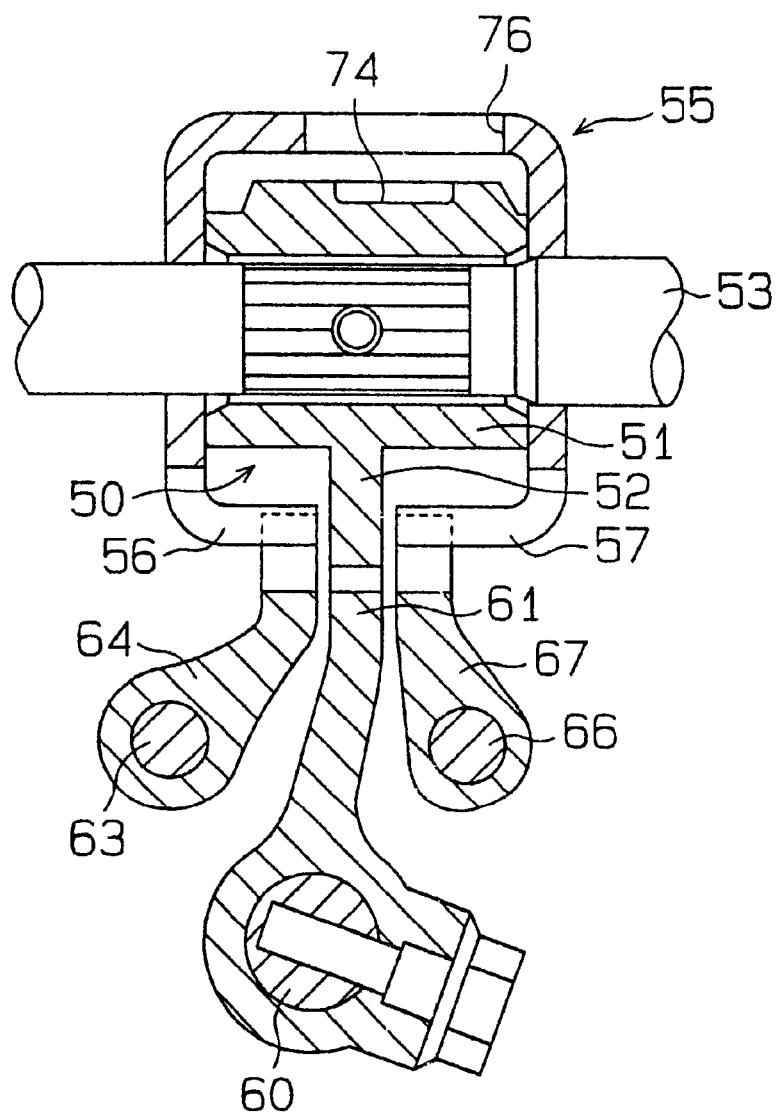
FIG. 5 is a cross-sectional view of a part of a known synchromesh-type transmission.
Figure 6:
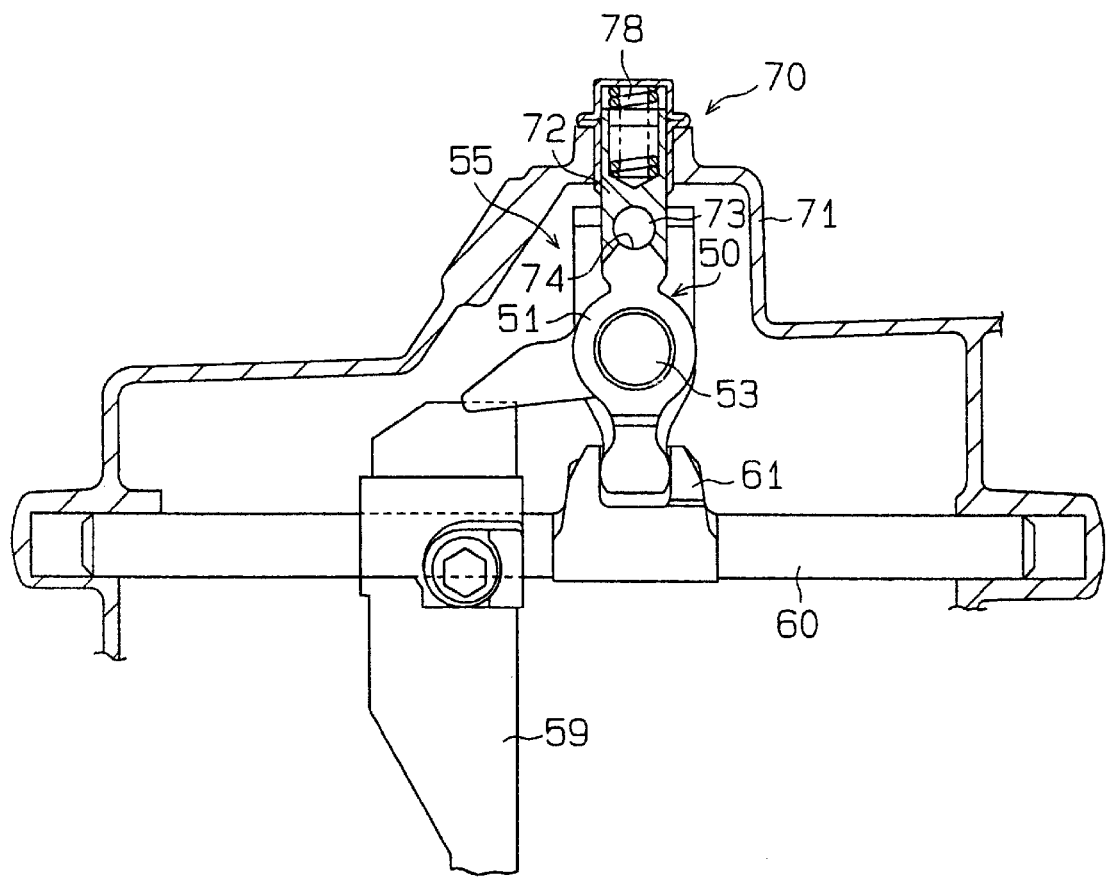
FIG. 6 is a plan view of the known synchromesh-type transmission illustrated in FIG. 5.
Figure 7:
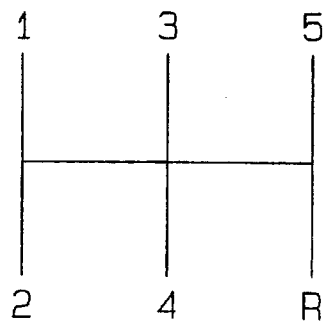
FIG. 7 is a schematic illustration of a known shift pattern of a shift lever.

An interlock plate 27, illustrated in FIGS. 2(a)–(c) is accommodated on the shift and select shaft 20 and surrounds the inner lever 26. The structure and operation of the interlock plate 27 according to this first embodiment of the present invention is the same as the structure and operation of the interlock plate 55 shown in FIG. 5 and described above. Therefore, a detailed description of the interlock plate 27 will not be repeated here. The interlock plate 27 is axially movable with the shift and select shaft 20, but is not rotatable due to a lock ball mechanism. The structure and operation of the lock ball mechanism is the same as the structure and operation of the lock ball mechanism 70 shown in FIG. 6 and described above. Thus, a detailed description of the lock ball mechanism will not be repeated here.

As shown in FIG. 2(a), the shift head 11 of the shift fork shaft 10 is provided with an inclined portion 11a at an inner side edge of the shift head 11 and at the side of the shift head 14 (i.e., at the side of the shift head 11 facing the shift head 14). An inner side edge of the shift head 12 of the shift fork shaft 10 is formed as a right angle portion.

The shift head 14 of the shift fork shaft 13 is provided with an inclined portion 14a at the inner side edge of the shift head 14 and at the side of the shift head 17 (i.e., at the side of the shift head 14 facing the shift head 17). The shift head 15 of the shift fork shaft 13 is provided with an inclined portion 15a at the inner side edge of the shift head 15 and at the side of the shift head 12 (i.e., at the side of the shift head 15 facing the shift head 12). The inner side edge of the shift head 17 of the shift fork shaft 16 is formed as a right angle portion. The shift head 18 of the shift fork shaft 16 is provided with an inclined portion 18a at the inner side edge of the shift head 18 and at the side of the shift head 15 (i.e., at the side of the shift head 18 facing the shift head 15). As further illustrated in FIG. 2(b), the inner lever 26 is provided with an inclined portion 26c at the upper inner side edge and an inclined portion 26d at the lower outer side edge.

A control device for the synchromesh-type transmission according to the first embodiment of the present invention includes a first sensor 31 and a second sensor 32, and an electronic control unit ECU 35. The first sensor 31 is disposed adjacent to the shift and select shaft 20 for detecting the axial moving amount of the shift and select shaft 20. The second sensor 32 is disposed adjacent to the shift and select shaft 20 for detecting the rotational moving amount of the shift and select shaft 20. Detected signals from the first and second sensors 31, 32 are fed to the ECU 35, with the actuator 25 then being controlled based upon the input signals.

Figure 3:
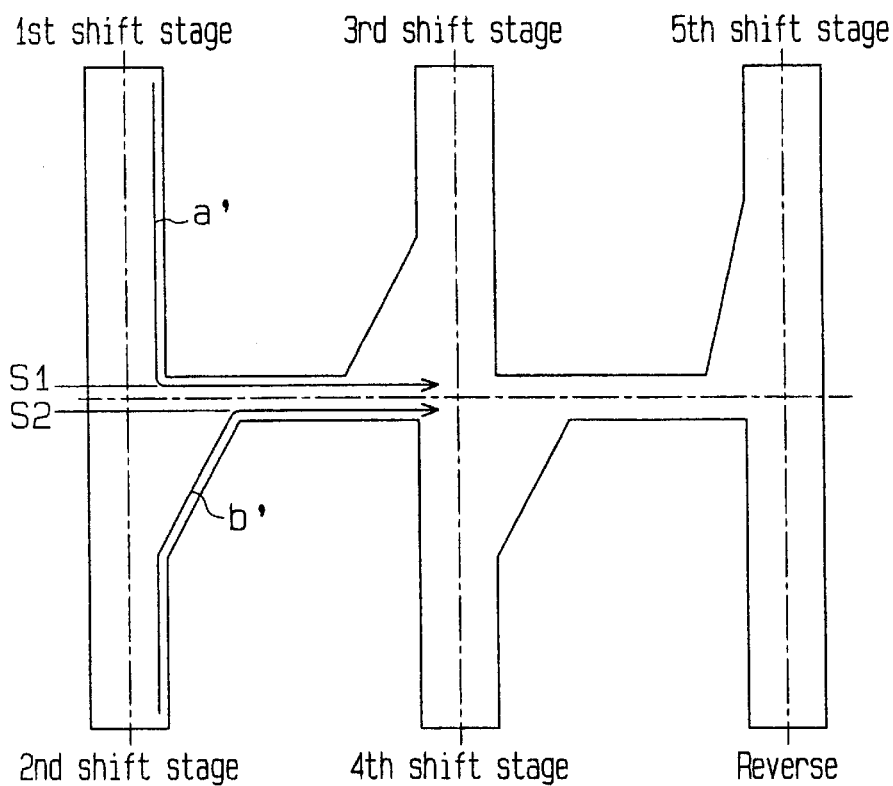
FIG. 3 is a schematic illustration of a moving path of an inner lever according to a shift operation of a shift lever in accordance with a first embodiment of the present invention.

Referring to FIGS. 1–3, the shift operation of the first embodiment of the present invention is as follows. As shown in FIG. 2(a), the inner lever 26 is disposed between the shift heads 11 and 12 of the shift fork shaft 10 for the lower shift stage. The inner lever 26 then comes in contact with the shift head 11 for moving the shift fork shaft 10 in the same direction (in the direction of the shift head 11), wherein the first shift stage is performed. Referring to FIG. 2(b), a neutral position of the inner lever 26 may be detected when the inner lever 26 is moved from the above-described position for the first shift stage and then is disposed between the shift heads 14 and 15 of the shift fork shaft 13 for the middle shift stage.

For example, the shift and select shaft 20 is applied with the driving force from the actuator 25 in the axial direction of the shift and select shaft 20 and is rotated by the actuator 25. As shown by the arrow ① in FIG. 2(a), a side surface 26a of the inner lever 26 is pushed against a side surface 14b of the shift head 14. At the same time, as shown by the arrow ② in FIG. 2(a), an end surface 26b of the inner lever 26 comes in contact with an opposing surface of the shift head 12, wherein the shift fork shaft 10 is moved in the other direction (i.e., in the direction of the shift head 12).

When the inner lever 26, (i.e. the fork shaft 10) is moved in the direction of the shift head 12 and the side surface 26a is released from pushing against the side surface 14b of the shift head 14, the inner lever 26 is moved toward the shift fork shaft 13 in the axial direction of the shift and select shaft 20 (i.e., in the direction for the select operation). While the above-described movement of the inner lever 26 is performed, the rotational amount of the inner lever 26 is detected by the second sensor 32. When the shift and select shaft 20 starts moving in the axial direction, the movement of the shift and select shaft 20 is detected by the first position sensor 31. At this stage, the rotational movement of the inner lever 26 (i.e., the shift and select shaft 20) by the actuator 25 is interrupted.

The inner lever 26 is pushed against the shift head 14 along the path a in FIG. 2(b). The inner lever 26 is moved along the path a' in FIG. 2(b) and FIG. 3. When the rotational movement of the inner lever 26 is stopped, the inner lever 26 is located at a position S1. That is, the position S1 is determined as the neutral position of the inner lever 26. The moving amount of the inner lever 26 from the first shift stage position to the position S1 is input to the ECU 35.

The inner lever 26 is shifted from the shift head 12 of the shift fork shaft 10 toward the shift heads 14, 15 of the shift fork shaft 13 for the middle shift stage. The inner lever 26 is pushed against the shift head 15 as shown by the arrow ③ in FIG. 2 and is moved in the direction of the neutral position as shown by the arrow ④ in FIG. 2(c). The inner lever 26 is pushed against the shift head 15 along the path b in FIG. 2(b). The inner lever 26 Is moved along the path b' in FIG. 2(b) and FIG. 3. When the inner lever 26 is released from pushing against the shift head 15 and the rotational movement of the inner lever 26 in the direction of the neutral position is stopped, the inner lever 26 is located at the position S2. The position S2 is determined as the neutral position of the inner lever 26. The moving amount of the inner lever 26 from the second shift stage to the position S2 is input to the ECU 35. From the foregoing, it can be seen that the inclined side edges of the inner lever 26 (as well as the inclined side edges of the various shift heads) contribute to the movement characteristics that permit detection of the neutral position of the inner lever 26 during shifting between the various stages. Thus, for example, the inclined portion 26c at the upper inner side edge contributes to the movement of the inner lever 26 from the second shift stage to the third shift stage and from the fourth shift stage to the fifth shift stage. The inclined portions 26d at the lower outer side edge contributes to the movement of the inner lever 26 from the third shift stage to the second shift stage and from the fifth shift stage to the fourth shift stage.

As described above, according to the first embodiment of the present invention, the neutral positions S1, S2 are detected with a constant distance therebetween in a direction for the shift operation. Therefore, when the inner lever 26 is moved to the neutral position from a shift stage position, the operation of the actuator 25 is controlled by the ECU 35 based upon the detected signals from the first and second position sensors 31, 32. Therefore, the moving and rotational amount of the shift and select shaft 20 is controlled by the actuator 25, wherein the inner lever 26 is moved along the paths shown in FIG. 3.

As described above, when the inner lever 26 is moved from the first shift stage position to the neutral position, the inner lever 26 is first moved in the direction for the shift operation and is then moved in the direction for the select operation. On the other hand, when the inner lever 26 is moved from the second shift stage position to the neutral position, the inner lever 26 is first moved in the direction for the shift operation and is then moved in a direction forming an acute angle with the direction for the shift operation, and finally in the direction for the select operation. As far as the inner lever 26 is located between the neutral positions S1, S2, the select operation may be performed and the double engagement can be inhibited or prevented.

According to the first embodiment of the present invention, the neutral positions S1, S2 of the inner lever 26 have the constant distance therebetween. Therefore, a fine control is not required to determine the position where the rotation of the shift and select shaft 20 is stopped. Further, the moving amount of the shift and select shaft 20 can be detected by the first position sensor 31 which generally is not excessively expensive. Therefore, the manufacturing cost of the control device can be reduced.

Figure 4:
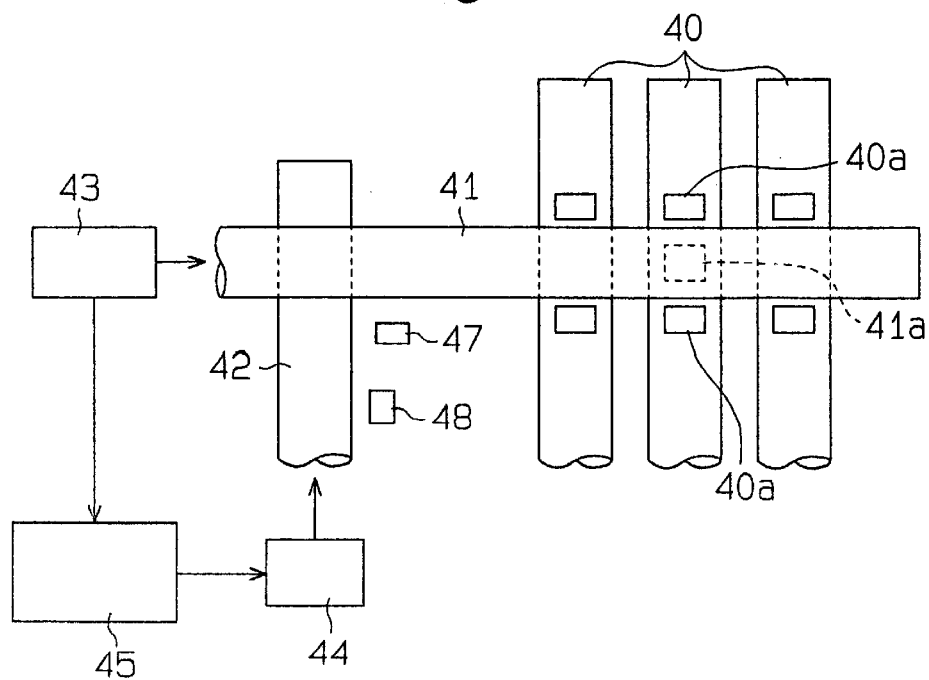
FIG. 4 is a schematic illustration of a synchromesh-type transmission and a control device according to another embodiment of the present invention.

A second embodiment of the present invention is shown in FIG. 4. In this embodiment, the synchromesh-type transmission is provided with a plurality of shift fork shafts 40, a select shaft 41 mounted at right angles with each shift fork shaft 40, and a shift shaft 42 mounted at right angles with the select shaft 41. Further, the synchromesh-type transmission is activated by a hydraulic pressure cylinder 43 for driving the select shaft 41, a hydraulic pressure cylinder 44 for driving the shift shaft 42, and an electronic control unit ECU 45 for controlling the hydraulic pressure cylinders 43, 44.

More specifically, each shift fork shaft 40 is provided with a pair of shift heads 40a and a shift fork (not shown). The select shaft 41 is provided with an inner lever 41a which is engageable with any one of the shift heads 40a. The select shaft 42 is provided with an engaging portion (not shown) which is engageable with the select shaft 41. The moving amount of the select shaft 41 is detected by a first position sensor 47 and the moving amount of the shift shaft 42 is detected by a second position sensor 48. The detected signals from the first and second position sensors 47, 48 are fed to the ECU 45.

For example, the select shaft 41 is moved by the actuator 43 and the inner lever 41a is disposed between the shift heads 40a of the shift fork shaft 40 for the middle shift stage. When the shift shaft 42 is axially moved by the actuator 44, the shafts 41, 42 move as a unit. Further, the inner lever 41a is pushed against one of the shift heads 40a of the shift fork shaft 40 for the middle shift stage. Therefore, the selected shift fork shaft 40 is moved in a direction of the shift head 40a. The relationship between the inner lever 40a and the shift head 41a and the effect generated thereby are fundamentally the same as the relationship between the inner lever 26 and the respective shift heads 11 and 12, 14 and 15, 17 and 18, and the effect generated thereby as described above in connection with the first embodiment shown in FIGS. 2 and 3. The transmission employing the select shaft 41 and the shift shaft 42 according to the second embodiment also supplies another effect in addition to the effects according to the first embodiment. That is, the moving operation of the select shaft 41 and the shift shaft 42 can be easily controlled comparing to the transmission employing the shift and select shaft 20 according to the first embodiment.

The description set forth above describes the way in which the control device of the present invention accurately detects the neutral position of the inner lever 26. The description describes the shift operation from the first stage to the neutral position and from the second stage to the neutral position for purposes of determining the neutral position of the inner lever 26, but it is to be understood that a similar shift operation is also carried out in connection with shift operations from the other shift stages to the neutral position in the manner illustrated in FIG. 3.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A control device for a synchromesh-type transmission comprising a shift and select shaft that is axially movable or rotatable for carrying out a select operation and a shift operation;

a plurality of axially movable shift fork shafts arranged in parallel with one another and at right angles with the shift and select shaft;

a pair of shift heads mounted on each of the shift fork shafts at a position opposed to the shift and select shaft;

an inner lever fixed to the shift and select shaft and positionable between the pair of shift heads mounted on one of the shift fork shafts based on axial movement operation or rotational operation of the shift and select shaft for the select operation, the inner lever moving from a neutral position and coming in contact with one of the shift heads based on the rotational operation or axial movement operation of the shift and select shaft upon the shift operation, or the inner lever being released from the one shift head and returning from a shift stage position to the neutral position based on the rotational operation or axial movement operation of the shift and select shaft upon the shift operation;

measuring means for measuring a moving amount of the inner lever from the shift stage position to the neutral position, with the inner lever disposed between the pair of shift heads of any one of the shift fork shafts being moved from the shift stage position to the neutral position while being pushed against a shift head of a neighboring shift fork shaft; and control means for controlling a rotational amount or axially movement amount of the shift and select shaft based upon the moving amount measured by the measuring means.

2. The control device for a synchromesh-type transmission according to claim 1, including a lock ball mechanism for locking any one of the shift fork shafts at the neutral position.

3. The control device for a synchromesh-type transmission according to claim 1, wherein the measuring means includes a first sensor for detecting the axial moving amount of the shift and select shaft and a second sensor for detecting the rotational moving amount of the shift and select shaft.

4. The control device for a synchromesh-type transmission according to claim 3, wherein the axial moving amount of the shift and select shaft detected by the first sensor and the rotational moving amount of the shift and select shaft detected by the second sensor are used to determine if the inner lever has been released from pushing against one of the pair of shift heads mounted on one of the shift fork shafts.

5. The control device for a synchromesh-type transmission according to claim 1, wherein the axial moving amount and the rotational moving amount of the shift and select shaft detected by the measuring means are used to determine if the inner lever has been released from pushing against one of the pair of shift heads mounted on one of the shift fork shafts.

6. The control device for a synchromesh-type transmission according to claim 1, wherein the two shift heads on one of the shift fork shafts include a first shift head having an inner side provided with an inclined side edge and a second shift head having an inner side that is devoid of an inclined side edge.

7. The control device for a synchromesh-type transmission according to claim 1, wherein the two shift heads on a first one of the shift fork shafts include a first shift head having an inner side provided with an inclined side edge and a second shift head having an inner side provided with an inclined side edge, and the two shift heads on a second one of the shift fork shafts include a first shift head having an inner side provided with an inclined side edge and a second shift head having an inner side that is devoid of an inclined side edge.

8. A control device for a synchromesh-type transmission comprising:

a plurality of axially movable shift fork shafts disposed in parallel with one another;

a select shaft axially movable for carrying out a select operation and arranged at right angles with the plurality of shift fork shafts;

a shift shaft axially movable for carrying out a shift operation and disposed at right angles with the select shaft;

a pair of shift heads mounted on each of the shift fork shafts at a position opposed to the select shaft;

an inner lever fixed to the select shaft in opposing relation to the plurality of shift fork shafts, the inner lever being disposed between the pair of shift heads mounted on any one of the shift fork shafts in accordance with axial moving operation of the select shaft upon the select operation, the inner lever coming in contact with one of the shift heads in accordance with axial moving operation of the shift shaft upon the shift operation, or the inner lever being released from the one shift head and returning from a shift stage position to a neutral position in accordance with the axial moving operation of the shift shaft upon the shift operation;

measuring means for measuring a moving amount of the inner lever from the shift stage position to the neutral position, the inner lever disposed between the pair of shift heads of one of the shift fork shafts being moved from the shift stage position to the neutral position while being pushed against a shift head of a neighboring shift fork shaft; and control means for controlling an amount of the axial moving of the shift shaft based upon the moving amount measured by the measuring means.

9. The control device for a synchromesh-type transmission according to claim 8, including a lock ball mechanism for locking any one of the shift fork shafts at the neutral position.

10. The control device for a synchromesh-type transmission according to claim 8, wherein the measuring means includes a first sensor for detecting the axial moving amount of the select shaft and a second sensor for detecting the axial moving amount of the shift shaft.

11. The control device for a synchromesh-type transmission according to claim 8, wherein the moving amounts of the select shaft and the shift shaft detected by the measuring means are used to determine if the inner lever has been released from pushing against one of the pair of shift heads mounted on one of the shift fork shafts.

12. The control device for a synchromesh-type transmission according to claim 10, wherein the axial moving amount of the select shaft detected by the first sensor and the axially moving amount of the shift shaft detected by the second sensor are used to determine if the inner lever has been released from pushing against one of the pair of shift heads mounted on one of the shift fork shafts.

13. The control device for a synchromesh-type transmission according to claim 8, wherein the two shift heads on one of the shift fork shafts include a first shift head having an inner side provided with an inclined side edge and a second shift head having an inner side that is devoid of an inclined side edge.

14. The control device for a synchromesh-type transmission according to claim 8, wherein the two shift heads on a first one of the shift fork shafts include a first shift head having an inner side provided with an inclined side edge and a second shift head having an inner side provided with an inclined side edge, and the two shift heads on a second one of the shift fork shafts include a first shift head having an inner side provided with an inclined side edge and a second shift head having an inner side that is devoid of an inclined side edge.

15. A control device for a synchromesh-type transmission comprising:

a shift and select shaft that is axially movable or rotatable for carrying out a select operation and a shift operation;

a plurality of axially movable shift fork shafts arranged in parallel with one another and at right angles with the shift and select shaft;

a pair of shift heads mounted on each of the shift fork shafts at a position opposed to the shift and select shaft;

an inner lever fixed to the shift and select shaft and positionable between the pair of shift heads mounted on one of the shift fork shafts based on axial movement operation or rotational operation of the shift and select shaft for the select operation, the inner lever moving from a neutral position and coming in contact with one of the shift heads based on the rotational operation or axial movement operation of the shift and select shaft upon the shift operation, or the inner lever being released from the one shift head and returning from a shift stage position to the neutral position based on the rotational operation or axial movement operation of the shift and select shaft upon the shift operation;

measuring means for measuring a moving amount of the inner lever from the shift stage position to the neutral position, with the neutral position of the inner lever being determined when the inner lever disposed between the pair of shift heads of any one of the shift fork shafts has been moved from the shift stage position and is released from being pushed against the shift head of a neighboring shift fork shaft; and control means for controlling a rotational amount or axially movement amount of the shift and select shaft based upon the moving amount measured by the measuring means.

16. The control device for a synchromesh-type transmission according to claim 15, including a lock ball mechanism for locking any one of the shift fork shafts at the neutral position.

17. The control device for a synchromesh-type transmission according to claim 15, wherein the measuring means includes a first sensor for detecting the axial moving amount of the shift and select shaft and a second sensor for detecting the rotational moving amount of the shift and select shaft.

18. A control device for a synchromesh-type transmission comprising a plurality of axially movable shift fork shafts disposed in parallel with one another;

a select shaft axially movable for carrying out a select operation and arranged at right angles with the plurality of shift fork shafts;

a shift shaft axially movable for carrying out a shift operation and disposed at right angles with the select shaft;

a pair of shift heads mounted on each of the shift fork shafts at a position opposed to the select shaft;

an inner lever fixed to the select shaft in opposing relation to the plurality of shift fork shafts, the inner lever being disposed between the pair of shift heads mounted on any one of the shift fork shafts in accordance with axial moving operation of the select shaft upon the select operation, the inner lever coming in contact with one of the shift heads in accordance with axial moving operation of the shift shaft upon the shift operation, or the inner lever being released from the one shift head and returning from a shift stage position to a neutral position in accordance with the axial moving operation of the shift shaft upon the shift operation;

measuring means for measuring a moving amount of the inner lever from the shift stage position to the neutral position, with the neutral position of the inner lever being determined when the inner lever disposed between the pair of shift heads of any one of the shift fork shafts has been moved from the shift stage position and is released from being pushed against the shift head of a neighboring shift fork shaft; and control means for controlling an amount of the axial moving of the shift shaft based upon the moving amount measured by the measuring means.

19. The control device for a synchromesh-type transmission according to claim 18, including a lock ball mechanism for locking any one of the shift fork shafts at the neutral position.

20. The control device for a synchromesh-type transmission according to claim 18, wherein the measuring means includes a first sensor for detecting the axial moving amount of the select shaft and a second sensor for detecting the axial moving amount of the shift shaft.

* * * * *